United States Patent
Soma

(10) Patent No.: US 8,219,304 B2
(45) Date of Patent: Jul. 10, 2012

(54) VEHICLE, CONTROLLER FOR THE VEHICLE, AND METHOD OF CONTROLLING THE VEHICLE

(75) Inventor: Takaya Soma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 469 days.

(21) Appl. No.: 12/449,219

(22) PCT Filed: Mar. 5, 2008

(86) PCT No.: PCT/JP2008/054438
§ 371 (c)(1),
(2), (4) Date: Jul. 29, 2009

(87) PCT Pub. No.: WO2008/111595
PCT Pub. Date: Sep. 18, 2008

(65) Prior Publication Data
US 2010/0004806 A1 Jan. 7, 2010

(30) Foreign Application Priority Data
Mar. 7, 2007 (JP) .................................. 2007/057534

(51) Int. Cl.
*B60W 20/00* (2006.01)
(52) U.S. Cl. .................. 701/111; 701/22; 701/54; 477/3
(58) Field of Classification Search ............... 180/65.22, 180/65.1, 65.21–65.265, 65.6, 65.285; 701/22, 701/54, 51, 111, 36, 65.8; 477/2, 3, 5, 7, 477/8, 15
See application file for complete search history.

(56) References Cited

U.S. PATENT DOCUMENTS

| 6,621,244 B1* | 9/2003 | Kiyomiya et al. ............ 318/611 |
| 6,840,341 B2* | 1/2005 | Fujikawa ................... 180/65.25 |
| 7,023,150 B2* | 4/2006 | Hisada et al. ................... 318/34 |
| 2005/0167170 A1 | 8/2005 | Hisada et al. |

FOREIGN PATENT DOCUMENTS

CN 1907747 A 2/2007
(Continued)

OTHER PUBLICATIONS

Chinese Office Action dated Dec. 12, 2011 for Chinese Patent Application No. 200880007168.8 (with translation).

Primary Examiner — Richard M. Camby
(74) Attorney, Agent, or Firm — Oliff & Berridge, PLC

(57) ABSTRACT

An ECU includes: a feedforward torque calculation unit for calculating a feedforward term of torque which reduces vibrations of a vehicle, by inputting a sum of a first requested driving force, which is identified as torque requested by a driver, and brake force into a vehicle model; a feedback torque calculation unit for calculating a feedback term of the torque which reduces vibrations of the vehicle, by inputting second requested driving force calculated from a revolution speed of wheels into the vehicle model; a second driving force calculation unit for calculating driving force to be achieved by an MG, by subtracting driving force to be achieved by an engine and an MG from a sum of the first requested driving force, the brake force, and the feedforward term and the feedback term of the torque which reduces vibrations of the vehicle; and an MG control unit for controlling MG to achieve the calculated driving force.

6 Claims, 12 Drawing Sheets

FOREIGN PATENT DOCUMENTS

| | | |
|---|---|---|
| EP | 1 097 834 A2 | 5/2001 |
| JP | A 2000-217209 | 8/2000 |
| JP | A 2001-132501 | 5/2001 |
| JP | A 2002-213592 | 7/2002 |
| JP | A 2005-20831 | 1/2005 |
| JP | A 2005-218280 | 8/2005 |
| JP | A 2006-60936 | 3/2006 |
| JP | A 2006-67655 | 3/2006 |
| JP | A 2006-69472 | 3/2006 |
| JP | A 2006-187168 | 7/2006 |
| JP | A 2006-224687 | 8/2006 |
| JP | A 2006-298293 | 11/2006 |

\* cited by examiner

VEHICLE, CONTROLLER FOR THE VEHICLE, AND METHOD OF CONTROLLING THE VEHICLE

TECHNICAL FIELD

The present invention relates to a vehicle, a controller for the vehicle, and a method of controlling the vehicle, and particularly relates to a technique of reducing vibrations of the vehicle.

BACKGROUND ART

In recent years, as part of measures to address environmental problems, an attention has been given to a hybrid vehicle, an electric vehicle, a fuel-cell vehicle, and the like that can run by driving force obtained from a rotating electrical machine (electric motor). Such a vehicle also vibrates during running under the influence of driving force of the vehicle itself, a state of a road surface, and others. Therefore, techniques of suppressing vibrations of the vehicle have been proposed.

Japanese Patent Laying-Open No. 2005-020831 discloses a driving force controller for reducing back and forth vibrations of an electric-powered vehicle, wheels of which are driven by a motor. This driving force controller includes: a standard driving force calculation unit for calculating standard driving force corresponding to an operation state of the vehicle; a road surface uneven portion detection unit for detecting a road surface uneven portion over which wheels pass during running; an additional driving force calculation unit for calculating additional driving force for the wheels, which additional driving force reduces wheel speed variations caused by the passage over the uneven portion; a composite driving force calculation unit for calculating composite driving force by adding up the additional driving force and the standard driving force; and a motor driving force control unit for controlling driving force of the motor such that the composite driving force is provided to the wheels.

According to the driving force controller described in this publication, when the wheels pass over a road surface uneven portion, the wheels are provided with the composite driving force, which is a sum of the additional driving force which reduces wheel speed variations caused by the passage over the uneven portion, and the standard driving force corresponding to the vehicle operation state. It is thereby possible to reduce back and forth vibrations of the vehicle body, caused by the variations in wheel speed during the passage over the uneven portion.

Some hybrid vehicles have an engine and two rotating electrical machines, and use the engine and one of the rotating electrical machines as a driving source, and use the other of the rotating electrical machines as an electric power generator. In such hybrid vehicles as well, it is desired to reduce the vibrations thereof. However, the driving force controller described in Japanese Patent Laying-Open No. 2005-020831 has no description about such hybrid vehicles.

DISCLOSURE OF THE INVENTION

An object of the present invention is to provide a vehicle having an engine and two rotating electrical machines and capable of reducing vibrations, a controller for the vehicle, and a method of controlling the vehicle.

A vehicle according to a certain aspect of the present invention includes: a differential mechanism having a first rotary element coupled to a first rotating electrical machine, a second rotary element coupled to a second rotating electrical machine, and a third rotary element coupled to an engine; a wheel to which torque is transmitted from the second rotary element; and an operation unit. The operation unit calculates torque which reduces vibrations of the vehicle, and controls any one of the second rotating electrical machine and the engine such that the controlled one of the second rotating electrical machine and the engine outputs the torque which reduces vibrations of the vehicle.

According to this configuration, the differential mechanism has the first rotary element coupled to the first rotating electrical machine, the second rotary element coupled to the second rotating electrical machine, and the third rotary element coupled to the engine. Torque is transmitted to the wheels of the vehicle from the second rotary element. Any one of the second rotating electrical machine and the engine is controlled to output the torque which reduces vibrations of the vehicle. It is thereby possible to provide the torque which reduces vibrations of the vehicle to the wheels. Accordingly, it is possible to reduce vibrations of the vehicle having an engine and two rotating electrical machines.

Preferably, the operation unit calculates torque to be outputted from the second rotating electrical machine, by factoring in the torque which reduces vibrations of the vehicle, and controls the second rotating electrical machine such that the second rotating electrical machine outputs the torque calculated by factoring in the torque which reduces vibrations of the vehicle to thereby output the torque which reduces vibrations of the vehicle.

According to this configuration, the torque to be outputted from the second rotating electrical machine is calculated by factoring in the torque which reduces vibrations of the vehicle. The second rotating electrical machine is controlled to output the torque calculated by factoring in the torque which reduces vibrations of the vehicle to thereby output the torque which reduces vibrations of the vehicle. It is thereby possible to quickly reduce vibrations of the vehicle by using the rotating electrical machine, which is superior to the engine in responsiveness.

Further preferably, the vehicle is mounted with a power storage mechanism for storing electric power to be supplied to the second rotating electrical machine. The operation unit calculates a limit value of a charging electric power value of the power storage mechanism, calculates a limit value of a discharging electric power value of the power storage mechanism, changes a gain in accordance with any one of the limit value of the charging electric power value and the limit value of the discharging electric power value, calculates torque requested by a driver, and calculates the torque which reduces vibrations of the vehicle, by using a product of the torque requested by the driver and the gain.

According to this configuration, the power storage mechanism stores the electric power to be supplied to the second rotating electrical machine. The limit value of the charging electric power value of the power storage mechanism and the limit value of the discharging electric power value of the power storage mechanism are calculated. In accordance with any one of the limit value of the charging electric power value and the limit value of the discharging electric power value, the gain is changed. Furthermore, the torque requested by the driver is calculated. By using the product of the torque requested by the driver and the gain, the torque which reduces vibrations of the vehicle is calculated. It is thereby possible to set the torque to be outputted for reducing vibrations of the vehicle, in accordance with any one of the limit value of the charging electric power value and the limit value of the discharging electric power value. Therefore, it is possible to prevent the electric power that goes beyond the capability of the power storage mechanism from being supplied to the power storage mechanism, and prevent the electric power that goes beyond the capability of the power storage mechanism from being discharged from the power storage mechanism. As a result, it is possible to achieve both of the reduction in vibrations with use of the second rotating electrical machine and protection of the power storage mechanism.

Further preferably, the vehicle further includes an atmospheric pressure sensor for detecting an atmospheric pressure. The operation unit changes a gain in accordance with the atmospheric pressure, calculates torque requested by a driver, and calculates the torque which reduces vibrations of the vehicle, by using a product of the torque requested by the driver and the gain.

According to this configuration, the gain is changed in accordance with the detected atmospheric pressure. Furthermore, the torque requested by the driver is calculated. By using the product of the torque requested by the driver and the gain, the torque which reduces vibrations of the vehicle is calculated. It is thereby possible to set the torque to be outputted for reducing vibrations of the vehicle, in accordance with the atmospheric pressure. Therefore, in the case that a surge voltage is likely to occur because of a low atmospheric pressure, the torque to be outputted by the second rotating electrical machine, namely, the electric power to be supplied to the second rotating electrical machine can be reduced. As a result, it is possible to achieve both of the reduction in vibrations with use of the second rotating electrical machine and protection of the second rotating electrical machine.

Further preferably, the operation unit calculates torque to be outputted from the engine by factoring in the torque which reduces vibrations of the vehicle, and controls the engine such that the engine outputs the torque calculated by factoring in the torque which reduces vibrations of the vehicle to thereby output the torque which reduces vibrations of the vehicle.

According to this configuration, the torque to be outputted from the engine is calculated by factoring in the torque which reduces vibrations of the vehicle. The engine is controlled to output the torque calculated by factoring in the torque which reduces vibrations of the vehicle to thereby output the torque which reduces vibrations of the vehicle. It is thereby possible to reliably reduce vibrations of the vehicle by using the engine, which is less likely to be influenced by an output limit of the battery and the like, when compared with the rotating electrical machine.

BEST MODES FOR CARRYING OUT THE INVENTION

Figure 1:
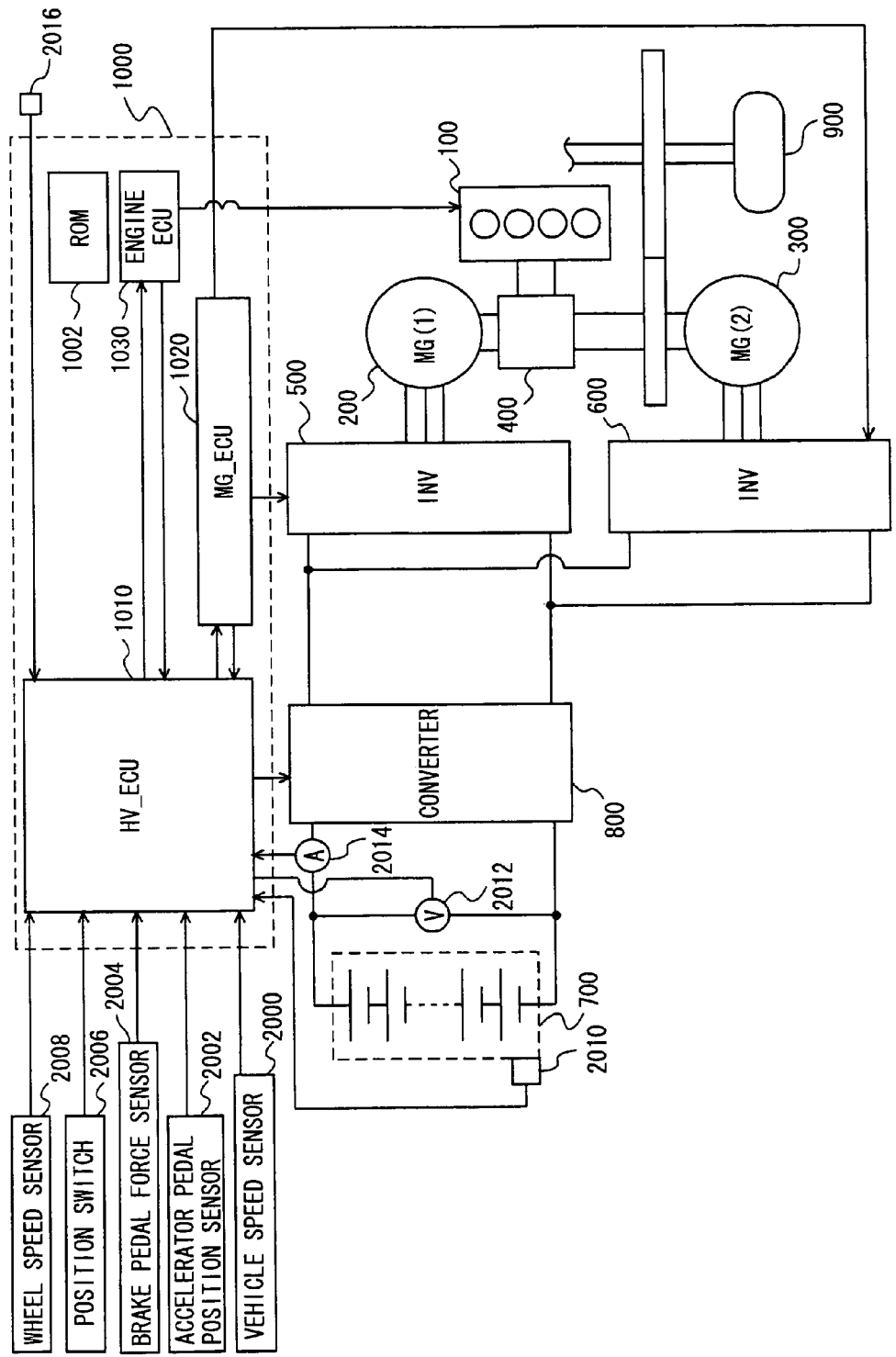
FIG. 1 is a schematic configuration diagram showing a hybrid vehicle mounted with a controller according to a first embodiment of the present invention.

The embodiments of the present invention will hereinafter be described with reference to the drawings. In the following description, the same parts are provided with the same reference characters, and have the same names and functions. Therefore, the detailed description thereof will not be repeated.

First Embodiment

With reference to FIG. 1, description will be made on a hybrid vehicle having a controller according to a first embodiment of the present invention. The vehicle includes an engine 100 serving as an internal combustion engine, an MG (Motor Generator) (1) 200, an MG (2) 300, a power split device 400, an inverter (1) 500, an inverter (2) 600, a battery 700, and a converter 800. The vehicle runs by driving force obtained from at least any one of engine 100 and MG (2) 300.

Engine 100, MG (1) 200, and MG (2) 300 are connected via power split device 400. Motive power generated by engine 100 is divided by power split device 400 into two paths. One of the paths is for driving wheels 900 through a reduction gear, while the other of the paths is for driving MG (1) 200 to generate electric power.

MG (1) 200 is a three-phase alternating-current motor. MG (1) 200 generates electric power by the motive power generated by engine 100 and divided by power split device 400. The electric power generated by MG (1) 200 is used in various manners depending on a running state of the vehicle and an SOC (State Of Charge) of battery 700. For example, during normal running, the electric power generated by MG (1) 200 is simply used as electric power for driving MG (2) 300. In contrast, if the SOC of battery 700 is below a predetermined value, the electric power generated by MG (1) 200 is converted by inverter 500 from an alternating current to a direct current, and then stored in battery 700 with its voltage regulated by converter 800.

When MG (1) 200 acts as an electric power generator, MG (1) 200 produces negative torque. Here, the negative torque represents torque that serves as a load of engine 100. When MG (1) 200 receives electric power to act as a motor, MG (1) 200 produces positive torque. Here, the positive torque represents torque that does not serve as a load of engine 100, namely, torque that assists engine 100 to rotate. The same applies to MG (2) 300.

MG (2) 300 is a three-phase alternating-current motor. MG (2) 300 is driven by at least any of the electric power stored in battery 700 and the electric power generated by MG (1) 200. Electric power converted by inverter (2) 600 from a direct current to an alternating current is supplied to MG (2) 300.

Driving force of MG (2) 300 is transmitted to the wheels through the reduction gear. MG (2) 300 thereby assists engine 100, and allows the vehicle to run by the driving force supplied from MG (2) 300 itself.

In contrast, when the hybrid vehicle is under regenerative braking, MG (2) 300 is driven by wheels 900 through the reduction gear to act as an electric power generator. MG (2) 300 thereby acts as a regenerative brake that converts braking energy into electric power. The electric power generated by MG (2) 300 is stored in battery 700 through inverter (2) 600.

Battery 700 is a battery pack configured by integrating a plurality of battery cells into a battery module, and furthermore, connecting a plurality of the battery modules in series. A discharging voltage from battery 700 and a charging voltage to battery 700 are regulated by converter 800. A capacitor may be provided instead of, or in addition to, battery 700.

The electric power stored in battery 700 is also supplied to auxiliary machines, in addition to MG (1) 200 and MG (2) 300. Charging of battery 700 and discharging of battery 700 are controlled to achieve an SOC of, for example, 60%.

Engine 100, inverter (1) 500, inverter (2) 600, and converter 800 are controlled by an ECU (Electronic Control Unit) 1000. ECU 1000 includes an HV (Hybrid Vehicle)_ECU 100, an MG_ECU 1020, and an engine ECU 1030.

The controller according to the present embodiment is implemented by ECU 1000 executing a program recorded in, for example, a ROM 1002. The program to be executed by ECU 1000 may be recorded in a recording medium such as a CD (Compact Disc) or a DVD (Digital Versatile Disc), and distributed on the market.

A signal indicative of a vehicle speed is inputted from a vehicle speed sensor 2000, a signal indicative of a position of an accelerator pedal (not shown) is inputted from an accelerator pedal position sensor 2002, a signal indicative of force on a brake pedal (not shown) is inputted from a brake pedal force sensor 2004, a signal indicative of a shift position (a position of a shift lever) is inputted from a position switch 2006, and a signal indicative of a revolution speed of wheels 900 is inputted from a wheel speed sensor 2008, to HV_ECU 1010.

Further, a signal indicative of a temperature of battery 700 is inputted from a temperature sensor 2010, a signal indicative of a voltage of battery 700 is inputted from a voltage sensor 2012, a signal indicative of a current of battery 700 is inputted from a current sensor 2014, and a signal indicative of an atmospheric pressure is inputted from an atmospheric pressure sensor 2016, to HV_ECU 1010.

HV_ECU 1010 calculates a charging electric power value and a discharging electric power value of battery 700 based on the vehicle speed, the accelerator pedal position, the brake pedal force, the shift position, and others. HV_ECU 1010 also calculates an charging electric power limit value WIN (maximum value of charging electric power) and a discharging electric power limit value WOUT (maximum value of discharging electric power) of battery 700 based on, for example, the temperature, the SOC, and the like of battery 700. The charging electric power value and the discharging electric power value of battery 700 are calculated such that they do not go beyond the respective limit values thereof.

HV_ECU 1010, MG_ECU 1020, and engine ECU 1030 are connected such that they can send and receive signals to and from one another. HV_ECU 1010 calculates, for example, driving forces to be achieved by engine 100, MG (1) 200, and MG (2) 300, based on a signal inputted to each of the ECUs and a program and a map stored in a memory (not shown).

MG_ECU 1020 controls inverter (1) 500 and inverter (2) 600 based on the driving force to be achieved by MG (1) 200 and the driving force to be achieved by MG (2) 300, and thereby controls MG (1) 200 and MG (2) 300. Engine ECU 1030 controls engine 100 based on the driving force to be achieved by engine 100.

Figure 2:
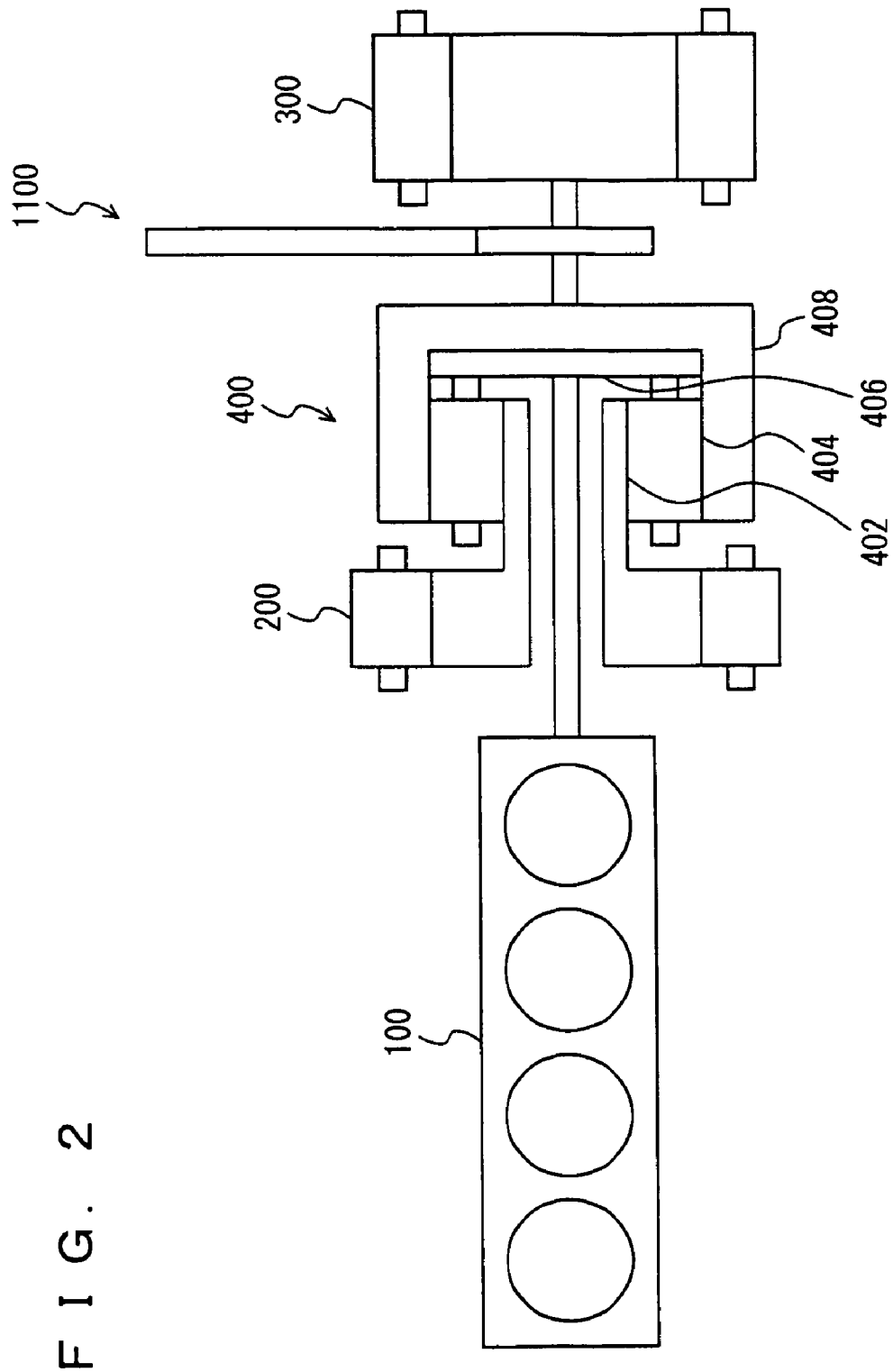
FIG. 2 is a diagram showing a power split device.

With reference to FIG. 2, power split device 400 will further be described. Power split device 400 is configured with a planetary gear including a sun gear 402, a pinion gear 404, a carrier 406, and a ring gear 408. In other words, power split device 400 is a differential.

Pinion gear 404 engages with sun gear 402 and ring gear 408. Carrier 406 rotatably supports pinion gear 404. Sun gear 402 is coupled to a rotary shaft of MG (1) 200. Carrier 406 is coupled to a crankshaft of engine 100. Ring gear 408 is coupled to a rotary shaft of MG (2) 300 and to reduction gear 1100. Accordingly, torque is eventually transmitted from ring gear 408 to wheels 900.

Figure 3:
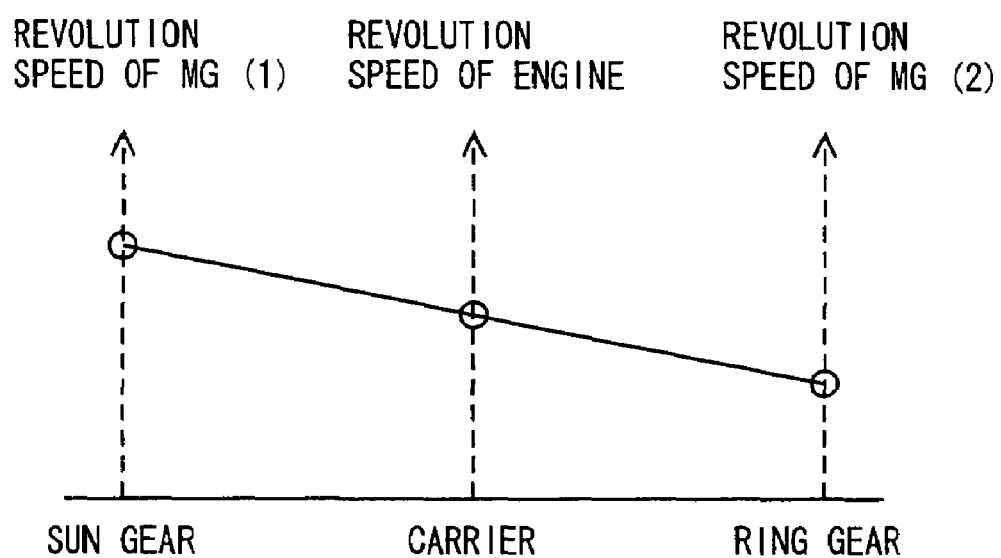
FIG. 3 is a (first) nomographic chart showing the relation among revolution speeds of an engine, an MG (1), and an MG (2).

Engine 100, MG (1) 200, and MG (2) 300 are coupled through power split device 400 formed of a planetary gear, and hence the revolution speeds of engine 100, MG (1) 200, and MG (2) 300 have a relation in which they are linearly connected with one another in a nomographic chart as shown in FIG. 3.

Figure 4:
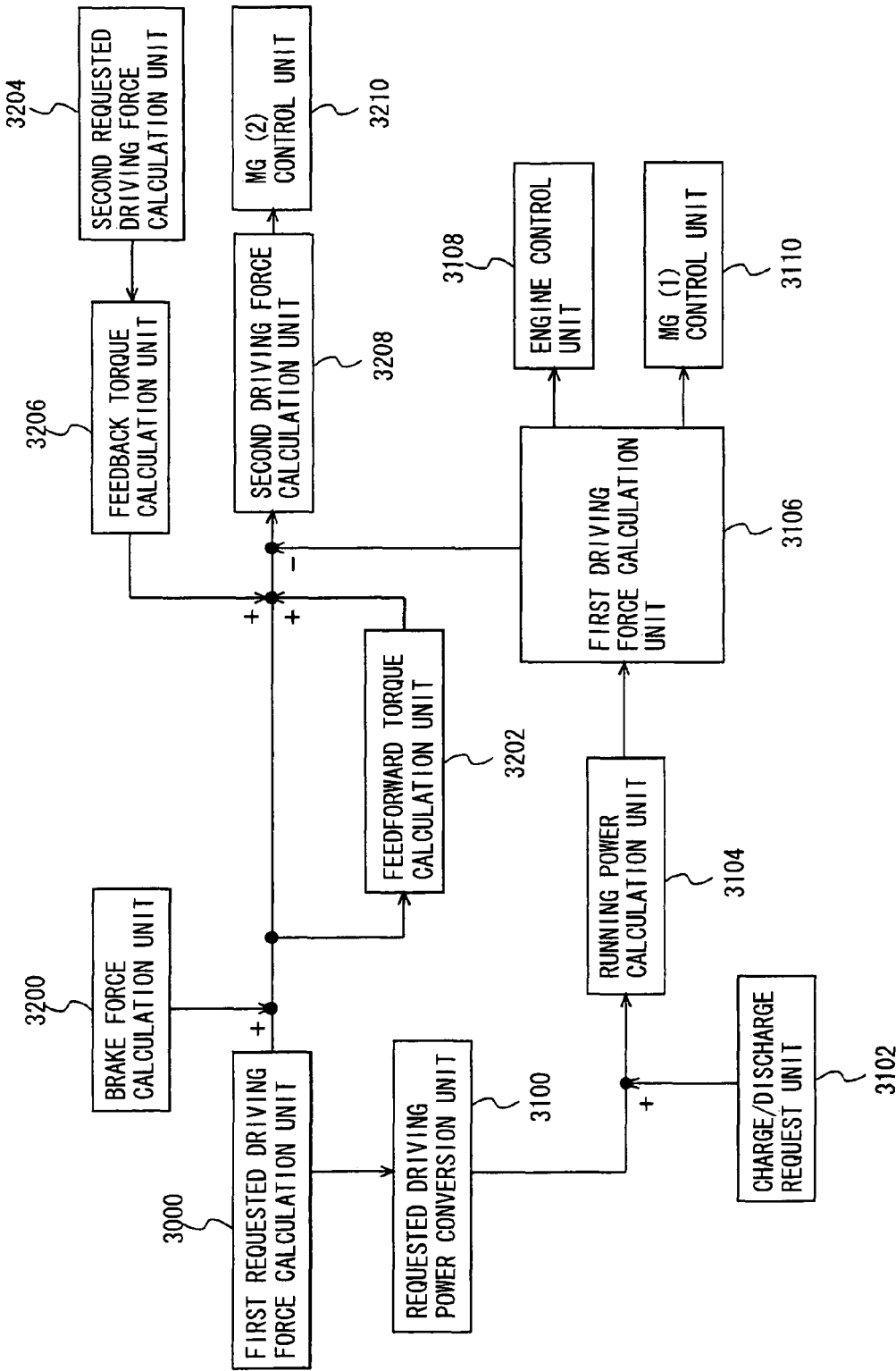
FIG. 4 is a functional block diagram of an ECU, which is the controller according to the first embodiment of the present invention.

With reference to FIG. 4, description will be made on functions of ECU 1000 serving as the controller according to the present embodiment. The functions described below may be implemented by hardware or may be implemented by software.

ECU 1000 includes a first requested driving force calculation unit 3000, a requested driving power conversion unit 3100, a charge/discharge request unit 3102, a running power calculation unit 3104, a first driving force calculation unit 3106, an engine control unit 3108, an MG (1) control unit 3110, a brake force calculation unit 3200, a feedforward torque calculation unit 3202, a second requested driving force calculation unit 3204, a feedback torque calculation unit 3206, a second driving force calculation unit 3208, and an MG (2) control unit 3210.

First requested driving force calculation unit 3000 calculates first requested driving force, which is torque requested by a driver, in accordance with a map including a vehicle speed, an accelerator pedal position, and a shift position as parameters. The map used for calculating the first requested driving force is created in advance by simulations, experiments, or the like, and recorded in ROM 1002.

In the present embodiment, driving force is expressed in the unit "N (newton)", and torque is expressed in the unit "N·m (newton meter)". Torque is calculated by multiplying driving force by a radius of wheels 900. For the radius of wheels 900, a constant is used. Accordingly, it is possible to calculate torque by calculating driving force. Conversely, it is possible to calculate driving force by calculating torque.

Requested driving power conversion unit 3100 converts the first requested driving force into requested driving power by multiplying the first requested driving force by a revolution speed of wheels 900, a radius of wheels 900, and the like. In the present embodiment, power is expressed in the unit "kW (kilowatt)". It is noted that a technique well known in the field of hybrid vehicles may be utilized for a method of converting driving force into power, and hence the detailed description thereof will not be repeated here.

Charge/discharge request unit 3102 calculates a charging electric power value of battery 700 and a discharging electric power value of battery 700, requested for a purpose other than running of the vehicle, in the case that the SOC of battery 700 is decreased, the case that electric power is to be supplied to auxiliary machines, or other cases. In the present embodiment, a charging electric power value and a discharging electric power value are expressed in the unit "kW".

Running power calculation unit 3104 calculates output powers of engine 100, MG (1) 200, and MG (2), respectively (in the unit "kW"). Each output power is set such that the optimal fuel economy is obtained, and that a total value of these output powers is equal to a value obtained by adding the charging electric power value of battery 700 or the discharging electric power value of battery 700 to the requested driving power.

First driving force calculation unit 3106 calculates driving force to be achieved by engine 100 and MG (1) 200. The driving force to be achieved by engine 100 and MG (1) 200 is calculated by output powers of engine 100 and MG (1) 200, respectively.

Engine control unit 3108 controls engine 100 such that the driving force calculated by first driving force calculation unit 3106 is achieved. MG (1) control unit 3110 controls MG (1) 200 such that the driving force calculated by first driving force calculation unit 3106 is achieved.

Brake force calculation unit 3200 calculates brake force (in the unit "N") requested for braking the vehicle, based on the force on a brake pedal, detected by brake pedal force sensor 2004. For example, with larger pedal force, larger brake force is calculated.

Feedforward torque calculation unit 3202 calculates a feedforward term of the torque which reduces vibrations of the vehicle, by inputting a sum of the first requested driving force and the brake force into a vehicle model (sprung part model).

The vehicle model refers to a model for analyzing bounce, pitching, and the like of the vehicle, caused by torque transmitted from wheels 900 to a road surface, an input from an outside of the vehicle, or the like, by utilizing an equation of motion and an equation of state of the vehicle.

Feedforward torque calculation unit 3202 uses the vehicle model, to thereby calculate torque to be added to or subtracted from wheels 900 so as to reduce the bounce and pitching of the vehicle to an optimal state. The optimal value of the bounce and pitching of the vehicle is determined by a designer.

In calculating the feedforward term of the torque, there is used a product of a gain G and a sum of the first requested driving force and the brake force, the sum being identified as an input value. With larger gain G, the torque having a larger absolute value is calculated. It is noted that a general, well-known technique may be utilized for the vehicle model and the method of calculating the torque which reduces vibrations of the vehicle by using the vehicle model, and thus the detailed description thereof will not be repeated here.

Second requested driving force calculation unit 3204 calculates second requested driving force, which is torque requested by the driver, from the revolution speed of wheels 900 detected with use of wheel speed sensor 2008. More specifically, the second requested driving force is calculated from an equation of motion (F=Ma) that uses acceleration a of the vehicle obtained from a rate of change in revolution speed of wheels 900, and vehicle weight M.

Feedback torque calculation unit 3206 calculates a feedback term of the torque which reduces vibrations of the vehicle, by inputting the second requested driving force into the vehicle model (sprung part model). In calculating the feedback term of the torque, there is used a product of gain G and the second requested driving force identified as an input value. With larger gain G, the torque having a larger absolute value is calculated.

Second driving force calculation unit 3208 calculates the driving force to be achieved by MG (2) 300. The driving force to be achieved by MG (2) 300 is calculated by subtracting the driving force to be achieved by engine 100 and MG (1) 200 from the sum of the first requested driving force, the brake force, and the feedforward term and the feedback term of the torque which reduces vibrations of the vehicle. It is noted that the torque which reduces vibrations of the vehicle is converted into driving force and used.

MG (2) control unit 3210 controls MG (2) 300 such that the driving, force calculated by second driving force calculation unit 3208 is achieved.

Figure 5:
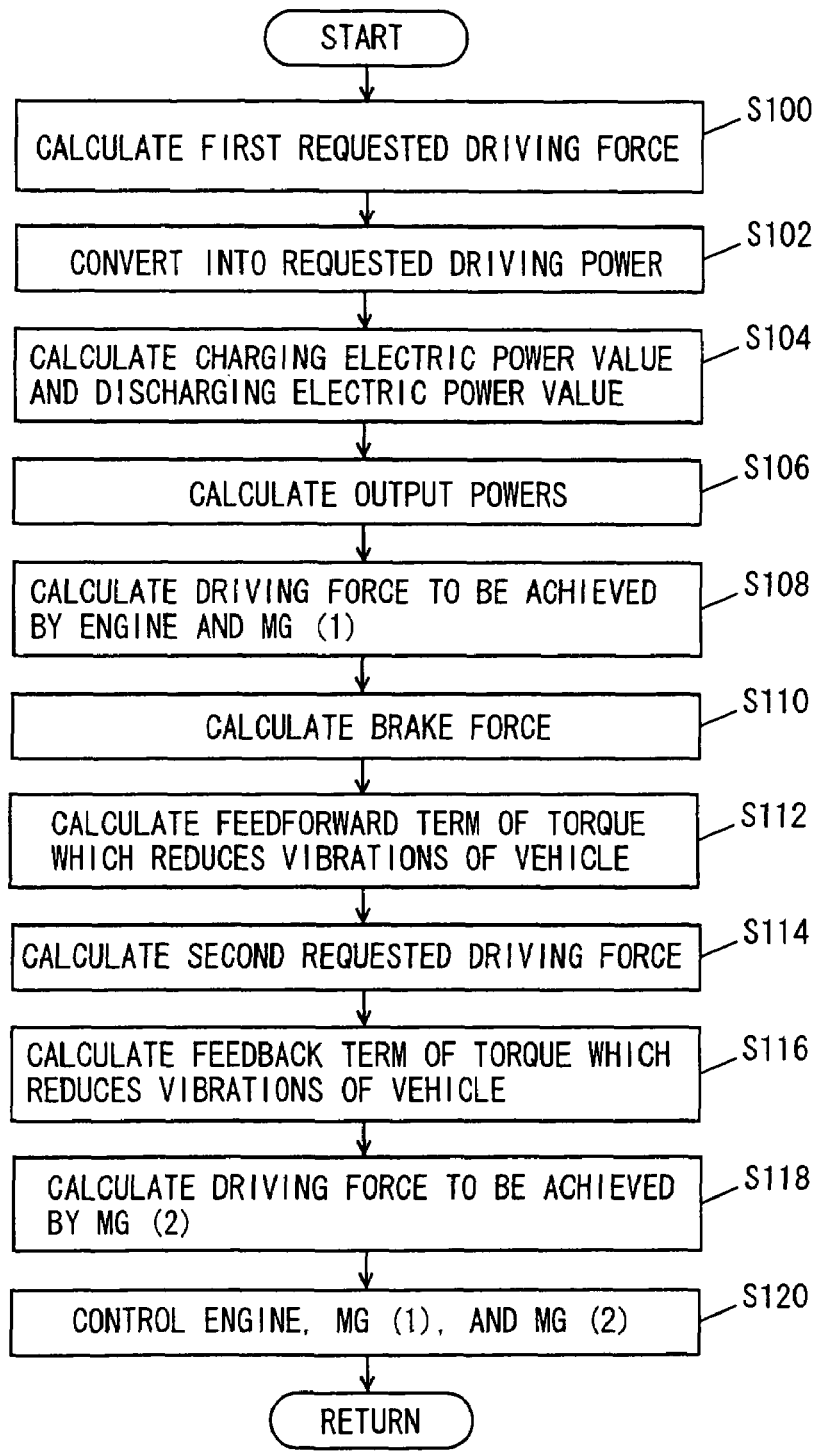
FIG. 5 is a flowchart showing a control structure of a program executed by the ECU, which is the controller according to the first embodiment of the present invention.

With reference to FIG. 5, description will be made on a control structure of the program executed by ECU 1000 serving as the controller according to the present embodiment. The program described below is repeatedly executed in predetermined cycles.

In step (hereinafter the step is abbreviated as S) 100, ECU 1000 calculates the first requested driving force, which is torque requested by the driver, in accordance with the map including a vehicle speed, an accelerator pedal position, and a shift position as parameters.

In S102, ECU 1000 converts the first requested driving force into requested driving power, by multiplying the first requested driving force by the revolution speed, the radius, and the like of wheels 900.

In S104, ECU 1000 calculates the charging electric power value of battery 700 and the discharging electric power value of battery 700, which are requested for a purpose other than running of the vehicle.

In S106, ECU 1000 calculates output powers of engine 100, MG (1) 200, and MG (2), respectively.

In S108, ECU 1000 calculates the driving force to be achieved by engine 100 and MG (1) 200.

In S110, ECU 1000 calculates the brake force requested for braking the vehicle, based on the force on a brake pedal detected by brake pedal force sensor 2004.

In S112, ECU 1000 calculates the feedforward term of the torque which reduces vibrations of the vehicle, by inputting the sum of the first requested driving force and the brake force into the vehicle model.

In S114, ECU 1006 calculates the second requested driving force, which is torque requested by the driver, from the revolution speed of wheels 900 detected with use of wheel speed sensor 2008.

In S116, EUC 1000 calculates the feedback term of the torque which reduces vibrations of the vehicle, by inputting the second requested driving force into the vehicle model.

In S118, ECU 1000 calculates the driving force to be achieved by MG (2) 300, by subtracting the driving force to be achieved by engine 100 and MG (1) 200 from the sum of the first requested driving force, the brake force, and the feedforward term and the feedback term of the torque which reduces vibrations of the vehicle.

In S120, ECU 1000 controls engine 100, MG (1) 200, and MG (2) 300 such that each of the driving forces is achieved.

Description will be made on an operation of ECU 1000 serving as the controller according to the present embodiment, based on the above-described structure and flowchart.

During running of the vehicle, the first requested driving force, which is torque requested by the driver, is calculated in accordance with the map including a vehicle speed, an accelerator pedal position, and a shift position as parameters (S100). By multiplying the first requested driving force by the revolution speed of wheels 900, the radius of wheels 900, and the like, the first requested driving force is converted into requested driving power (S102).

Further, the charging electric power value of battery 700 and the discharging electric power value of battery 700, both of which are requested for a purpose other than running of the vehicle, are calculated (S104). From the requested driving power, the charging electric power value of battery 700, and the discharging electric power value of battery 700, output power of each of engine 100, MG (1) 200, and MG (2) is calculated (S106).

From the output powers of engine 100 and MG (1) 200, respectively, the driving force to be achieved by engine 100 and MG (1) 200 is calculated (S108).

In addition, based on the force on a brake pedal detected by brake pedal force sensor 2004, the brake force requested for braking the vehicle is calculated (S110). By inputting the sum of the first requested driving force and the brake force into the vehicle model, the feedforward term of the torque which reduces vibrations of the vehicle is calculated (S112).

Further, from the revolution speed of wheels 900 detected with use of wheel speed sensor 2008, the second requested driving force, which is torque requested by the driver, is calculated (S114). By inputting the second requested driving force into the vehicle model, the feedback term of the torque which reduces vibrations of the vehicle is calculated (S116).

By subtracting the driving force to be achieved by engine 100 and MG (1) 200 from the sum of the first requested driving force, the brake force, and the feedforward term and the feedback term of the torque which reduces vibrations of the vehicle, the driving force to be achieved by MG (2) 300 is calculated (S118). In other words, by factoring in the torque which reduces vibrations of the vehicle, the driving force to be achieved by MG (2) 300 is calculated. It is thereby possible to allow the torque which reduces vibrations of the vehicle to be incorporated into the driving force, namely, the torque achieved by MG (2) 300.

Figure 6:
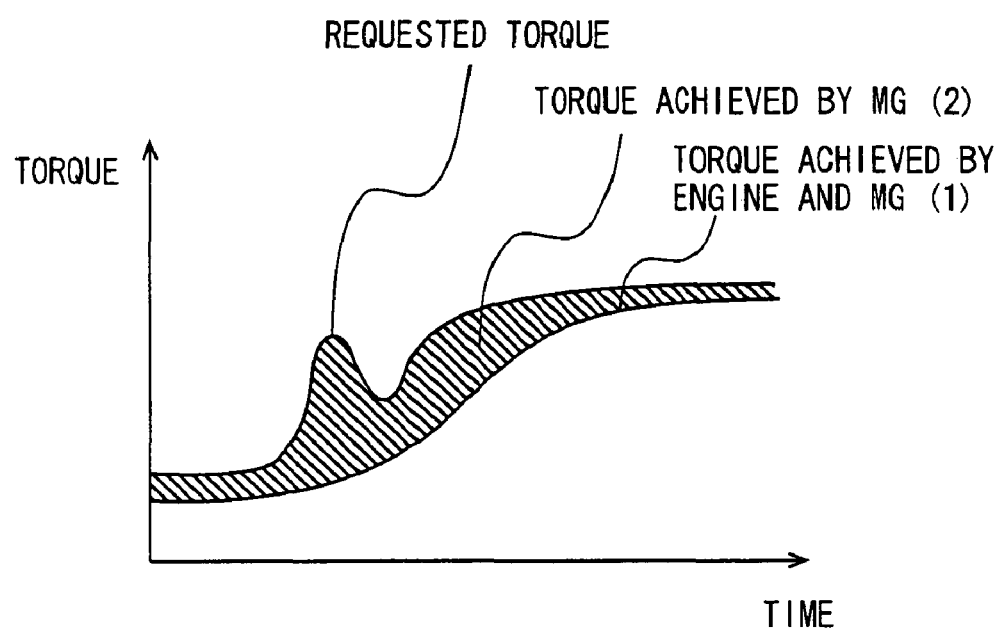
FIG. 6 is a diagram showing torques achieved by the engine, the MG (1), and the MG (2).

To achieve each of the calculated driving forces, engine 100, MG (1) 200, and MG (2) 300 are controlled (S120). As shown in FIG. 6, it is thereby possible to compensate for a shortage identified as a difference between the torque achieved by engine 100 and MG (1) 200 and the torque requested by the entire vehicle, by means of MG (2) 300. Further, it is also possible to allow MG (2) 300 to output the torque which reduces vibrations of the vehicle. Therefore, it is possible to quickly reduce the vibrations of the vehicle by MG (2) 300, which is superior to engine 100 in its responsiveness.

As described above, with the ECU serving as the controller according to the present embodiment in the hybrid vehicle including a power split device having a sun gear coupled to the MG (1), a ring gear coupled to the MG (2), and a carrier coupled to the engine, and wheels to which torque is transmitted from the ring gear, the MG (2) is controlled to output the torque which reduces vibrations of the vehicle. It is thereby possible to quickly reduce vibrations with use of MG (2), which is superior to the engine identified as an internal combustion engine in its responsiveness.

Second Embodiment

A second embodiment of the present invention will hereinafter be described. The present embodiment differs from the above-described first embodiment in that engine 100 is controlled to output the torque which reduces vibrations of the vehicle. Other structures are the same as, and have the same functions as, those of the first embodiment described above. Therefore, the description thereof will not be repeated here.

Figure 7:
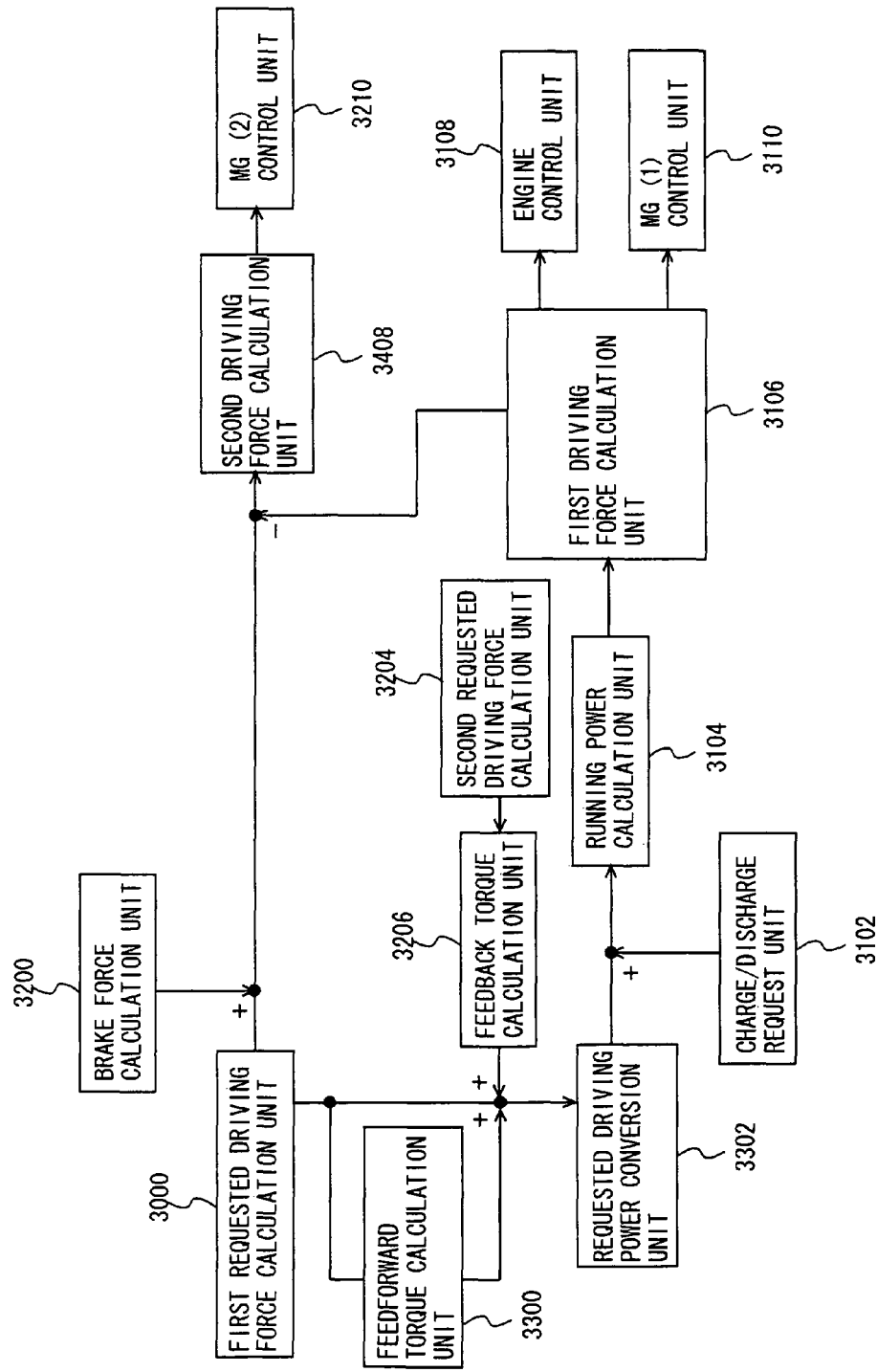
FIG. 7 is a functional block diagram of an ECU, which is a controller according to a second embodiment of the present invention.

With reference to FIG. 7, description will be made on functions of ECU 1000 serving as a controller according to the present embodiment. It is noted that the functions described below may be implemented by hardware or may be implemented by software. The same functions as those of the first embodiment described above are provided with the same numbers. Therefore, the detailed description thereof will not be repeated here.

As shown in FIG. 7, output values of a feedforward torque calculation unit 3300 and feedback torque calculation unit 3206 are inputted into a requested driving power conversion unit 3302.

Feedforward torque calculation unit 3300 calculates a feedforward term of the torque which reduces vibrations of the vehicle, by inputting the first requested driving force into the vehicle model. In calculating the feedforward term of the torque, there is used a product of gain G and the first requested driving force identified as an input value.

Requested driving power conversion unit 3302 converts the sum of the first requested driving force and the feedforward term and the feedback term of the torque which reduces vibrations of the vehicle into requested driving power. By multiplying the first requested driving force by the revolution speed of wheels 900, the radius of wheels 900, and the like, and by multiplying the feedforward term and the feedback term of the torque which reduces vibrations of the vehicle by the revolution speed of wheels 900, and the like, the requested driving power is calculated.

A second driving force calculation unit 3408 calculates the driving force to be achieved by MG (2) 300, by subtracting the driving force to be achieved by engine 100 and MG (1) 200 from the sum of the first requested driving force and the brake force.

Figure 8:
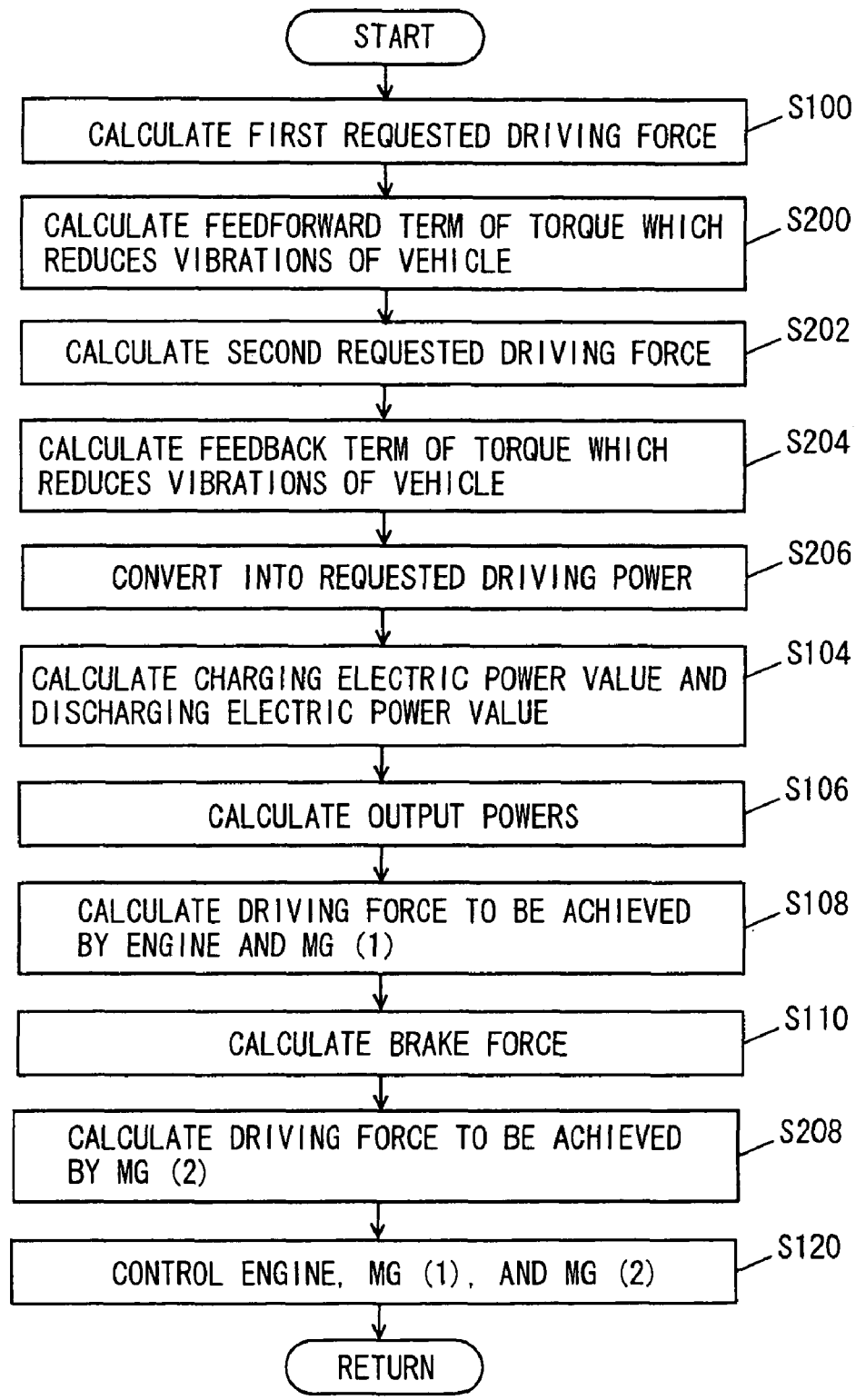
FIG. 8 is a flowchart showing a control structure of a program executed by the ECU, which is the controller according to the second embodiment of the present invention.

With reference to FIG. 8, description will be made on a control structure of a program executed by ECU 1000 serving as the controller according to the present embodiment. The program described below is repeatedly executed in predetermined cycles. It is noted that the same processing as that of the first embodiment described above is provided with the same step number. Therefore, the detailed description thereof will not be repeated here.

In S200, ECU 1000 calculates the feedforward term of the torque which reduces vibrations of the vehicle, by inputting the first requested driving force into the vehicle model.

In S202, ECU 1000 calculates the second requested driving force, which is torque requested by the driver, from the revolution speed of wheels 900 detected with use of wheel speed sensor 2008.

In S204, EUC 1000 calculates the feedback term of the torque which reduces vibrations of the vehicle, by inputting the second requested driving force into the vehicle model.

In S206, ECU 1000 converts the sum of the first requested driving force and feedforward term and the feedback term of the torque which reduces vibrations of the vehicle into requested driving power.

In S208, ECU 1000 calculates the driving force to be achieved by MG (2) 300, by subtracting the driving force to be achieved by engine 100 and MG (1) 200 from the sum of the first requested driving force and the brake force.

By doing so, it is possible to allow the torque which reduces vibrations of the vehicle to be incorporated into the driving force, namely, the torque achieved by engine 100. Therefore, it is possible to reliably reduce vibrations of the vehicle by using the engine, which is less likely to be influenced by an output limit of battery 700 and the like.

Third Embodiment

A third embodiment of the present invention will hereinafter be described. The present embodiment differs from the above-described first embodiment in that gain G, which is used in calculating the torque which reduces vibrations of the vehicle, is changed in accordance with a charging electric power limit value WIN or a discharging electric power limit value WOUT of battery 700. Other structures are the same as those of the first embodiment described above. Therefore, the detailed description thereof will not be repeated here.

Figure 9:
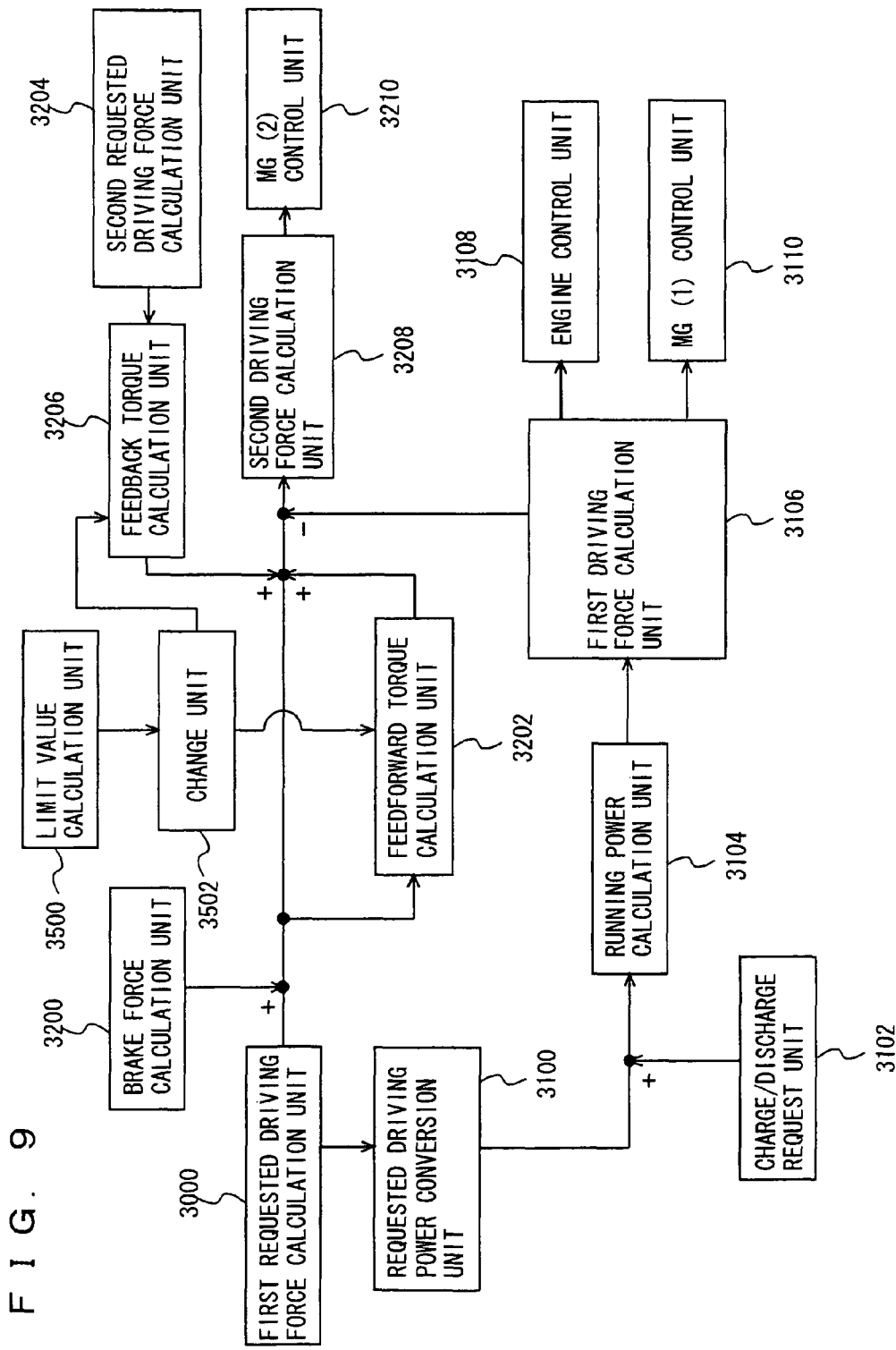
FIG. 9 is a functional block diagram of an ECU, which is a controller according to a third embodiment of the present invention.

With reference to FIG. 9, description will be made on functions of ECU 1000 serving as a controller according to the present embodiment. It is noted that the functions described below may be implemented by hardware or may be implemented by software. Further, the same functions as those of the first embodiment described above are provided with the same numbers. Therefore, the detailed description thereof will not be repeated here.

A limit value calculation unit 3500 shown in FIG. 9 calculates charging electric power limit value WIN of battery 700 and discharging electric power limit value WOUT of battery 700, based on a temperature, an SOC, and others of battery 700. For example, in accordance with a map including a temperature and an SOC of battery 700 as parameters, charging electric power limit value WIN and discharging electric power limit value WOUT are calculated.

A change unit 3502 changes gain G used in calculating the torque which reduces vibrations of the vehicle, namely, gain G used in feedforward torque calculation unit 3202 and feedback torque calculation unit 3206, in accordance with charging electric power limit value WIN and discharging electric power limit value WOUT.

Figure 10:
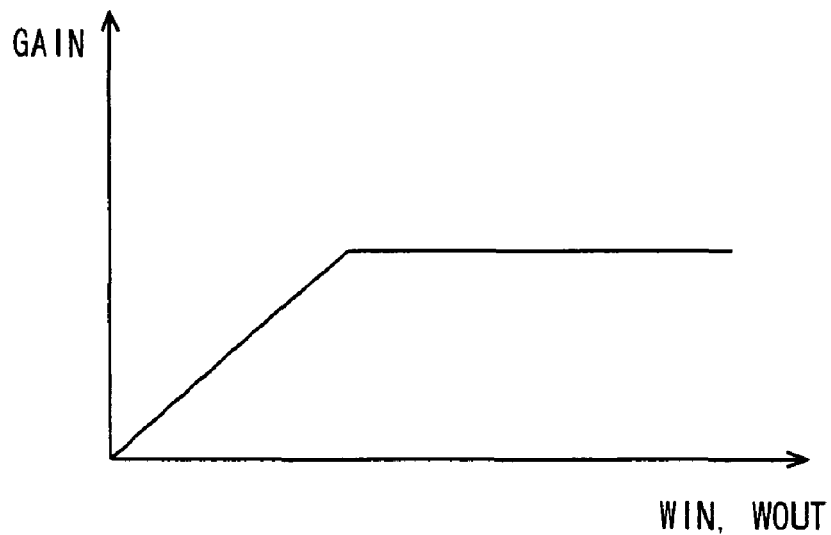
FIG. 10 is a (first) diagram showing a gain G.

As shown in FIG. 10, gain G is changed such that it becomes smaller as charging electric power limit value WIN or discharging electric power limit value WOUT is smaller. It is noted that the method of changing the gain is not limited thereto. The gain may be changed in accordance with any one of the charging electric power limit value WIN and discharging electric power limit value WOUT.

Figure 11:
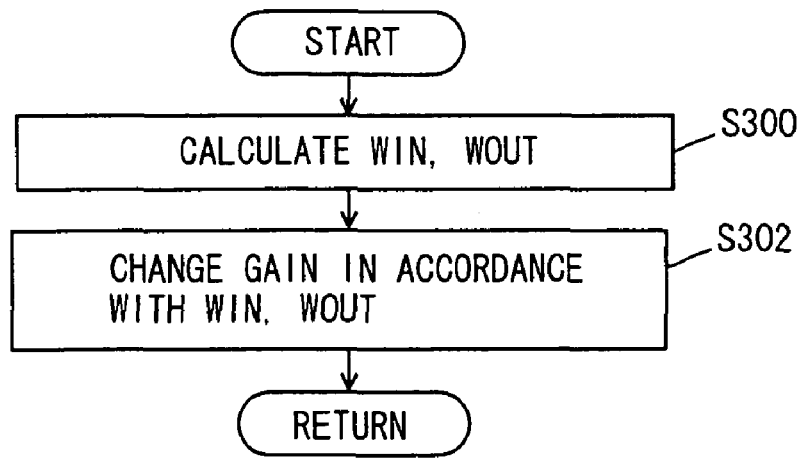
FIG. 11 is a flowchart showing a control structure of a program executed by the ECU, which is the controller according to the third embodiment of the present invention.

With reference to FIG. 11, description will be made on a control structure of a program executed by the ECU serving as the controller according to the present embodiment. It is noted that the program described below is executed in addition to the program in the first embodiment described above.

In S300, ECU 1000 calculates charging electric power limit value WIN of battery 700 and discharging electric power limit value WOUT of battery 700. In S302, ECU 1000 changes gain G used in calculating the torque which reduces vibrations of the vehicle, in accordance with charging electric power limit value WIN and discharging electric power limit value WOUT.

By doing so, it is possible to decrease an absolute value of the torque calculated for suppressing vibrations of the vehicle, as charging electric power limit value WIN or discharging electric power limit value WOUT is smaller. It is thereby possible to further reduce electric power to be generated and electric power to be consumed at MG (2) 300, as charging electric power limit value WIN or discharging electric power limit value WOUT is smaller. Therefore, it is possible to prevent the charging electric power value of battery 700 from going beyond charging electric power limit value WIN, and prevent the discharging electric power value of battery 700 from going beyond discharging electric power limit value WOUT. Consequently, it is possible to achieve both of reduction in vibrations with use of MG (2) 300 and protection of battery 700.

Fourth Embodiment

A fourth embodiment according to the present invention will hereinafter be described. The present embodiment differs from the above-described first embodiment in that gain G used in calculating the torque which reduces vibrations of the vehicle is changed in accordance with an atmospheric pressure. Other structures are the same as those of the first embodiment described above. Therefore, the detailed description thereof will not be repeated here.

Figure 12:
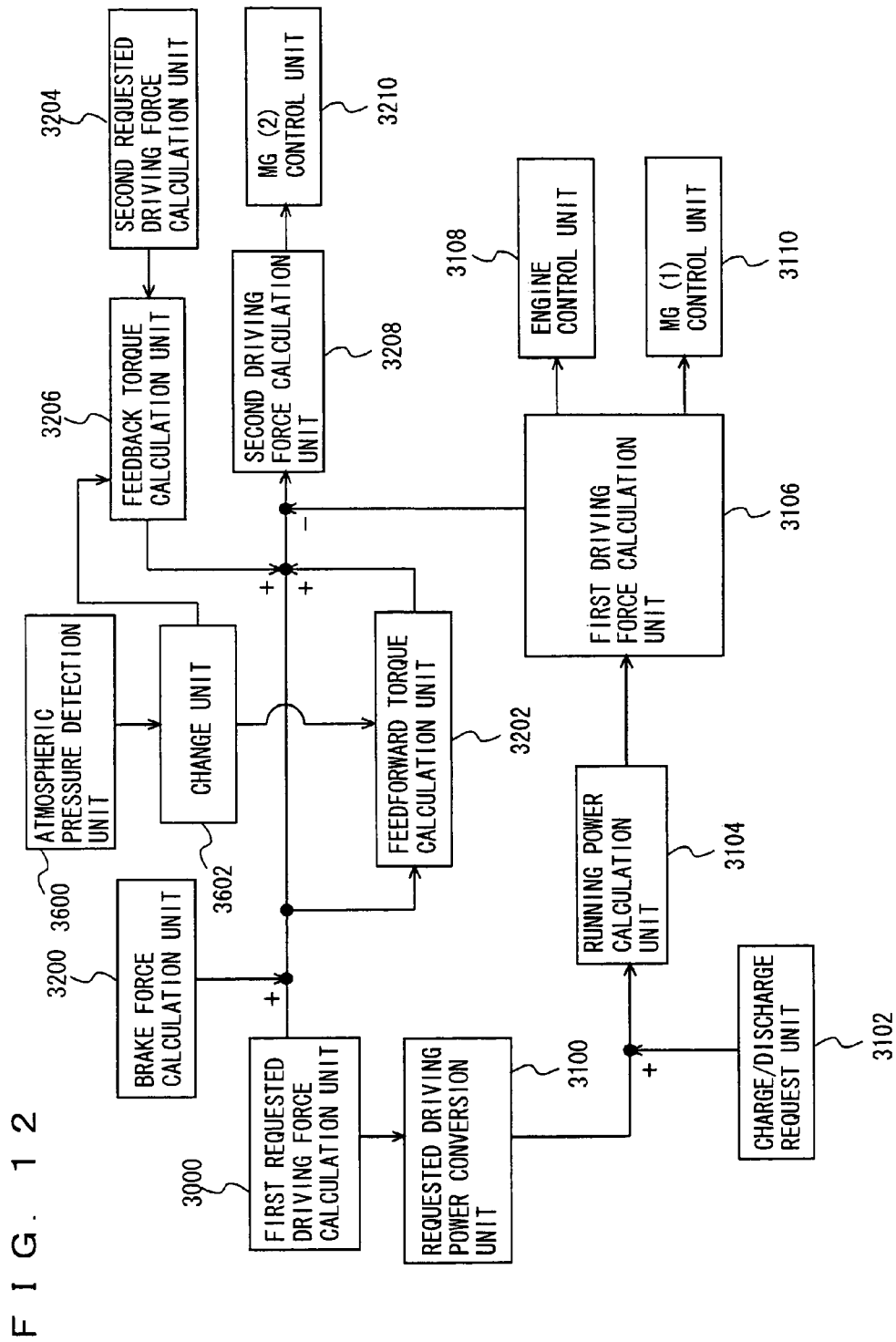
FIG. 12 is a functional block diagram of an ECU, which is a controller according to a fourth embodiment of the present invention.

With reference to FIG. 12, description will be made on functions of ECU 1000 serving as a controller according to the present embodiment. It is noted that the functions described below may be implemented by hardware or may be implemented by software. Further, the same functions as those of the first embodiment described above are provided with the same numbers. Therefore, the detailed description thereof will not be repeated here.

Figure 13:
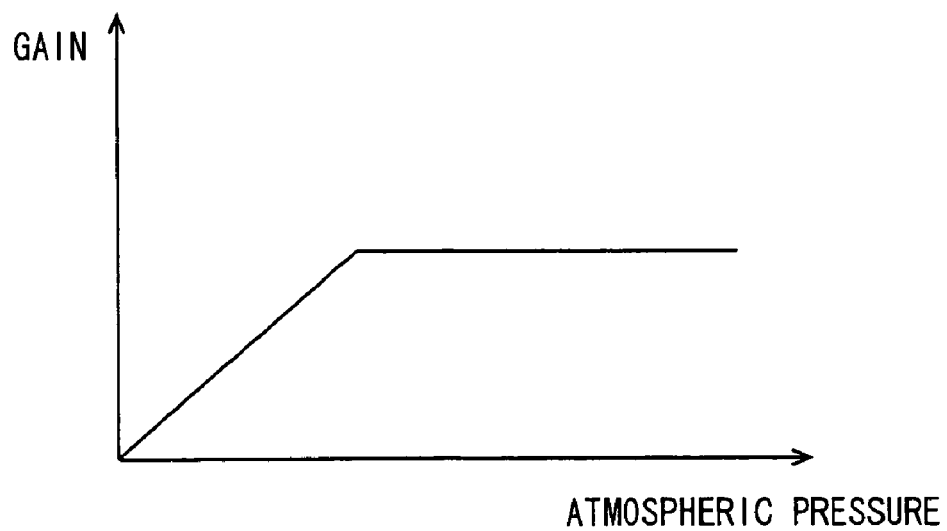
FIG. 13 is a (second) diagram showing gain G.

An atmospheric pressure detection unit 3600 shown in FIG. 12 detects an atmospheric pressure based on a signal transmitted from atmospheric pressure sensor 2016. A change unit 3602 changes gain G used in calculating the torque which reduces vibrations of the vehicle, namely, gain G used in feedforward torque calculation unit 3202 and feedback torque calculation unit 3206, in accordance with the atmospheric pressure. As shown in FIG. 13, gain G is changed such that it becomes smaller as the atmospheric pressure is lower. It is noted that the method of changing the gain is not limited thereto.

Figure 14:
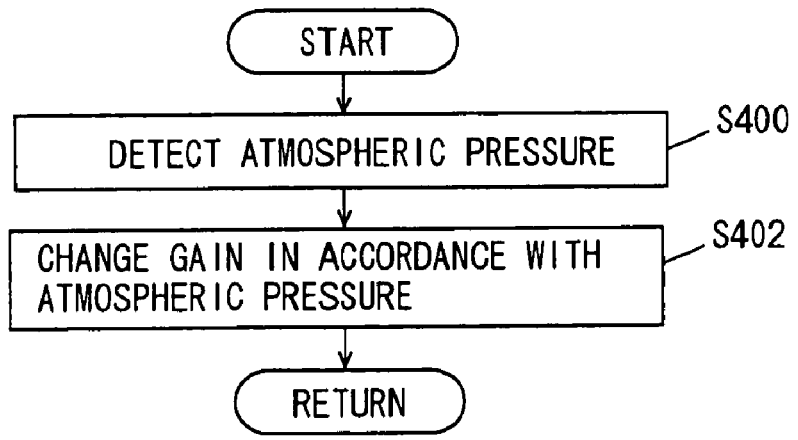
FIG. 14 is a flowchart showing a control structure of a program executed by the ECU, which is the controller according to the fourth embodiment of the present invention.

With reference to FIG. 14, description will be made on a control structure of a program executed by the ECU serving as the controller according to the present embodiment. It is noted that the program described below is executed in addition to the program in the first embodiment described above.

In S400, ECU 1000 detects an atmospheric pressure based on the signal transmitted from atmospheric pressure sensor 2016. In S402, ECU 1000 changes gain G used in calculating the torque which reduces vibrations of the vehicle, in accordance with the atmospheric pressure.

By doing so, as the atmospheric pressure is lower, it is possible to further decrease an absolute value of the torque calculated for suppressing vibrations of the vehicle. Accordingly, it is possible to further reduce electric power to be generated and electric power to be consumed at MG (2) 300, in the case that a surge voltage is likely to occur because of a low atmospheric pressure. Therefore, it is possible to prevent an excessive rise in an operating voltage of MG (2) 300. Consequently, both of reduction in vibrations with use of MG (2) 300 and protection of MG (2) 300 can be achieved.

It is noted that, instead of detecting an atmospheric pressure with use of atmospheric pressure sensor 2016, an altitude may be detected with use of a navigation system. In this case, change may be made such that gain G becomes smaller with a higher altitude.

It should be understood that the embodiments disclosed herein are illustrative and not limitative in all aspects. The scope of the present invention is shown not by the description above but by the scope of the claims, and is intended to include all modifications within the equivalent meaning and scope of the claims.

The invention claimed is:

1. A vehicle, comprising:
   a differential mechanism having a first rotary element coupled to a first rotating electrical machine, a second rotary element coupled to a second rotating electrical machine, and a third rotary element coupled to an engine;
   a wheel to which torque is transmitted from the second rotary element;
   a power storage mechanism for storing electric power to be supplied to the second rotating electrical machine;
   an operation unit that;
      controls any one of the second rotating electrical machine and the engine such that the controlled one of the second rotating electrical machine and the engine outputs the torque which reduces vibrations of the vehicle,
      calculates torque to be outputted from the second rotating electrical machine, by factoring in the torque, which reduces vibrations of the vehicle,
      calculates a limit value of a charging electric power value of the power storage mechanism,
      calculates a limit value of a discharging electric power value of the power storage mechanism,
      changes a gain in accordance with at least any one of the limit value of the charging electric power value and the limit value of the discharging electric power value,
      calculates torque requested by a driver, and
      calculates the torque which reduces vibrations of the vehicle, by using a product of the torque requested by the driver and the gain.

2. A vehicle, comprising:
   a differential mechanism having a first rotary element coupled to a first rotating electrical machine, a second rotary element coupled to a second rotating electrical machine, and a third rotary element coupled to an engine;
   a wheel to which torque is transmitted from the second rotary element;
   an atmospheric pressure sensor for detecting an atmospheric pressure;
   an operation unit that;
      controls any one of the second rotating electrical machine and the engine such that the controlled one of the second rotating electrical machine and the engine outputs the torque which reduces vibrations of the vehicle,
      calculates torque to be outputted from the second rotating electrical machine, by factoring in the torque which reduces vibrations of the vehicle,
      changes a gain in accordance with the atmospheric pressure,
      calculates torque requested by a driver, and
      calculates the torque which reduces vibrations of the vehicle, by using a product of the torque requested by the driver and the gain.

3. A method of controlling a vehicle including a differential mechanism having a first rotary element coupled to a first rotating electrical machine, a second rotary element coupled to a second rotating electrical machine, and a third rotary element coupled to an engine, and a wheel to which torque is transmitted from the second rotary element, and the vehicle is mounted with a power storage mechanism for storing electric power to be supplied to the second rotating electrical machine, the method comprising:
   controlling any one of the second rotating electrical machines and the engine such that the controlled one of the second rotating electrical machine and the engine outputs the torque which reduces vibrations of the vehicle,
   calculating torque to be outputted from the second rotating electrical machine, by factoring in the torque which reduces vibrations of the vehicle,
   calculating a limit value of a charging electric power value of the power storage mechanism,
   calculating a limit value of a discharging electric power value of the power storage mechanism,
   changing a gain in accordance with at least any one of the limit value of the charging electric power value and the limit value of the discharging electric power value, and
   calculating torque requested by a driver, and
   calculating the torque which reduces vibrations of the vehicle, by using a product of the torque requested by the driver and the gain.

4. A method of controlling a vehicle including a differential mechanism having a first rotary element coupled to a first rotating electrical machine, a second rotary element coupled to a second rotating electrical machine, and a third rotary element coupled to an engine, and a wheel to which torque is transmitted from the second rotary element, and an atmospheric pressure sensor for detecting an atmospheric pressure, the method comprising:
   controlling any one of the second rotating electrical machines and the engine such that the controlled one of the second rotating electrical machine and the engine outputs the torque which reduces vibrations of the vehicle,
   calculating torque to be outputted from the second rotating electrical machine, by factoring in the torque which reduces vibrations of the vehicle,
   detecting an atmospheric pressure,
   changing a gain in accordance with the atmospheric pressure, and
   calculating torque requested by a driver, and
   calculating the torque which reduces vibrations of the vehicle, by using a product of the torque requested by the driver and the gain.

5. A controller for a vehicle including a differential mechanism having a first rotary element coupled to a first rotating electrical machine, a second rotary element coupled to a second rotating electrical machine, and a third rotary element coupled to an engine, and a wheel to which torque is transmitted from the second rotary element, and the vehicle is mounted with a power storage mechanism for storing electric power to be supplied to said second rotating electrical machine, the controller comprising:
   calculation means for calculating torque which reduces vibrations of the vehicle,
   control means for controlling any one of the second rotating electrical machine and the engine such that the controlled one of the second rotating electrical machine and the engine outputs the torque which reduces vibrations of the vehicle,
   control means for calculating torque to be outputted from the second rotating electrical machine, by factoring in the torque which reduces vibrations of the vehicle,
   control means for calculating a limit value of a charging electric power value of the power storage mechanism,
   control means for calculating a limit value of a discharging electric power value of the power storage mechanism,
   control means for changing a gain in accordance with at least any one of the limit value of the charging electric power value and the limit value of the discharging electric power value, control means for calculating torque requested by a driver, and the calculation means includes means for calculating the torque which reduces vibrations of the vehicle, by using a product of the torque requested by the driver and the gain.

6. A controller for a vehicle including a differential mechanism having a first rotary element coupled to a first rotating electrical machine, a second rotary element coupled to a second rotating electrical machine, and a third rotary element coupled to an engine, and a wheel to which torque is transmitted from the second rotary element, and an atmospheric pressure sensor for detecting an atmospheric pressure, the controller comprising:

calculation means for calculating torque which reduces vibrations of the vehicle control means for controlling any one of the second rotating electrical machine and the engine such that the controlled one of the second rotating electrical machine and the engine outputs the torque which reduces vibrations of the vehicle, control means for calculating torque to be outputted from the second rotating electrical machine, by factoring in the torque which reduces vibrations of the vehicle, control means for detecting an atmospheric pressure, control means for changing a gain in accordance with the atmospheric pressure, control means for calculating torque requested by a driver, and the calculation means includes means for calculating the torque which reduces vibrations of the vehicle, by using a product of the torque requested by the driver and the gain.

* * * * *